March 1, 1960 E. G. CAMPBELL 2,926,701
LINER PIPES

Filed May 18, 1956 2 Sheets-Sheet 1

INVENTOR.
ERNEST G. CAMPBELL
BY
*Thredy & Thredy*
HIS ATTORNEYS.

March 1, 1960  E. G. CAMPBELL  2,926,701
LINER PIPES

Filed May 18, 1956  2 Sheets-Sheet 2

INVENTOR.
ERNEST G. CAMPBELL
BY
Threedy & Threedy
HIS ATTORNEYS.

United States Patent Office 2,926,701
Patented Mar. 1, 1960

2,926,701

LINER PIPES

Ernest G. Campbell, Chicago, Ill.

Application May 18, 1956, Serial No. 585,644

2 Claims. (Cl. 138—97)

This invention relates to certain new and useful improvements in liner pipes and has for its principal object the provision of an improved construction of this character which will be highly efficient in use and economical in manufacture.

The liner pipe embodying my invention is adapted to be telescoped in a pipe for conveying therethrough from a source of supply a gas or fluid. Normally the pipe lined by my improved liner pipe is buried within the ground or located in places where it is subjected to a rusting or pitting process which results in the formation of minute openings in the pipe through which the gas or fluid eventually escapes.

An object of this invention is to prevent such leakage or escape of the gas or fluid by incorporating in such pipe a liner conduit having a simple and effective means for independently sealing the liner conduit within the pipe lined thereby, thus extending the life and usefulness of the pipe.

Another and equally important object of the invention is the provision of a liner pipe which may be telescoped in the pipe to be lined thereby either at the factory or on the job where the lined pipe is to be installed or repaired.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
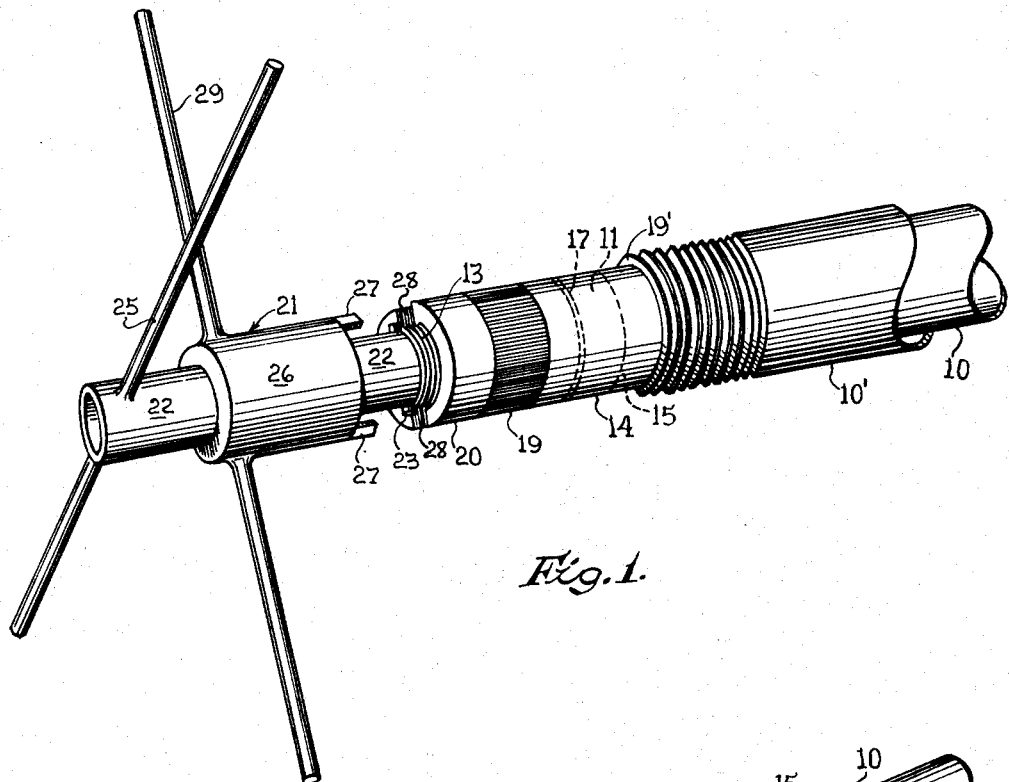
Fig. 1 is a perspective view of a pipe to be lined showing my improved pipe liner in position to be telescoped therein.
Figure 2:
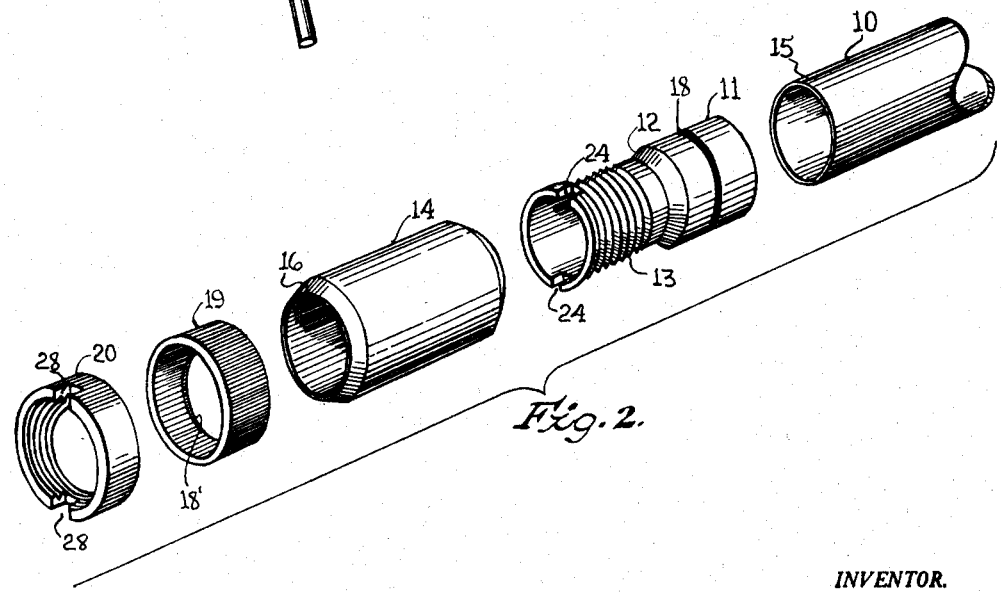
Fig. 2 is a perspective view of parts of my improved piper liner shown in exploded relation with respect to each other.
Figure 3:
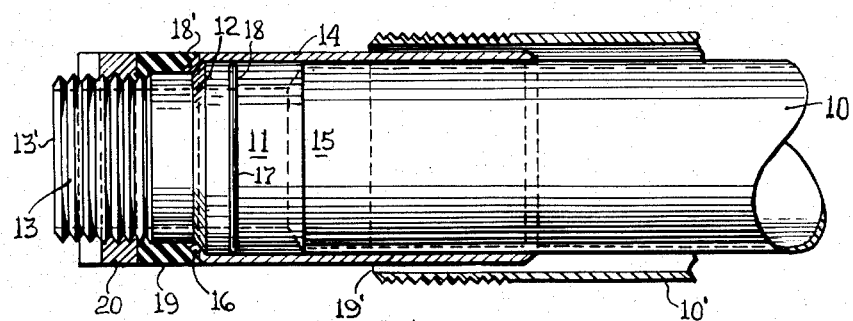
Fig. 3 is a sectional detail view showing the liner pipe in partially telescoped position within a pipe to be lined.
Figure 4:
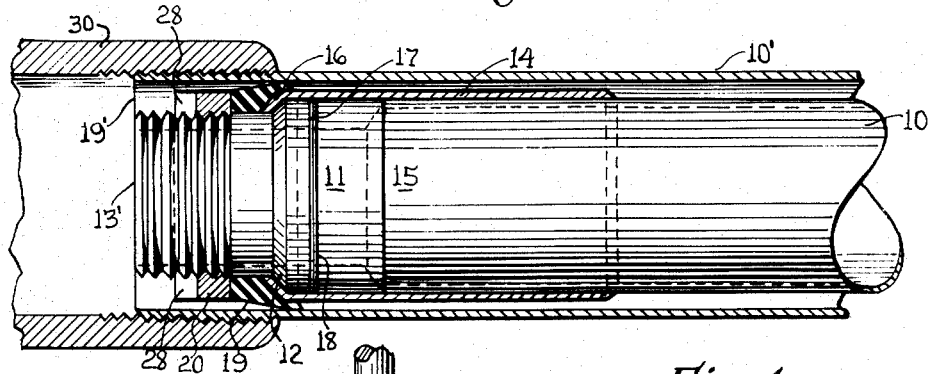
Fig. 4 is a sectional detail view of my improved pipe liner telescoped in the pipe lined thereby.
Figure 5:
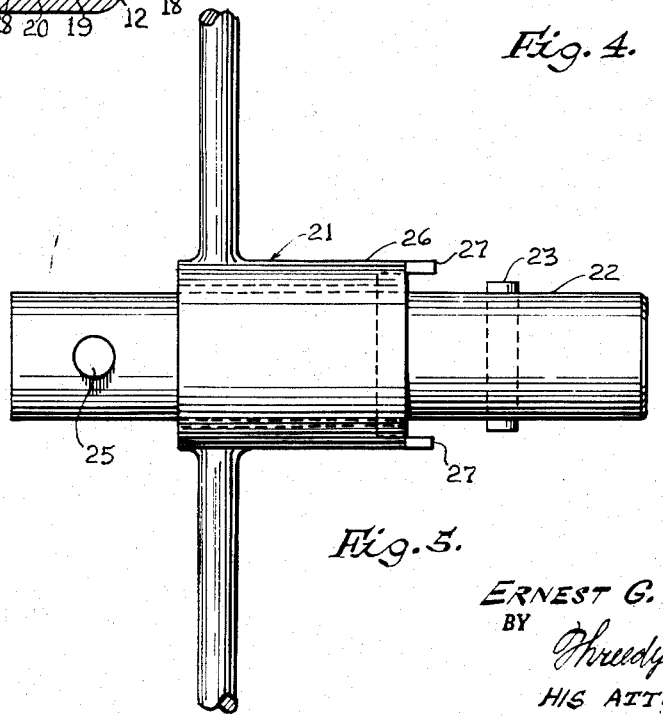
Fig. 5 is an elevational view of a tool employed in the assembly of my improved liner pipe.

Referring more particularly to the drawings, my invention in its preferred form of construction includes a liner pipe 10 which may be of various lengths corresponding to the required length for use in connection with the pipe to be lined. This liner pipe is preferably formed of polyethylene or other like durable material. Arranged in end abutment with one end portion of the liner pipe 10 is an extension section 11 having an intermediate shoulder 12 and terminating into a threaded neck portion 13.

Embracing the liner pipe 10 and fused or otherwise welded thereto is a sleeve 14 likewise formed of polyethylene or other like durable material. This sleeve 14 embraces the end portion 15 of the liner pipe 10 and extends over the extension section 11 with an end portion 16 flared inwardly to embrace the shoulder 12. A seal between the extension section 11 and the sleeve 14 is provided in the form of an O-ring 17 formed of suitable material and mounted in a groove 18 provided in the extension section 11. Embracing the extension section 11 at a point outwardly of the shoulder 12 is a sealing collar 19 formed of compressible material and having a tapered end portion 18' engageable with the shoulder 12.

Threaded upon the threaded neck portion 13 is a compression nut 20 which is threaded against the collar 19 compressing the same to deflect the shoulder-engaging portion thereof to a wedging position between the sleeve 14 and the pipe 10' within which the liner pipe section 10 is telescoped.

To facilitate the threading of the compression nut 20 upon the threaded portion 13 of the extension section 11, I provide a tool generally indicated at 21. This tool comprises a shank 22 carrying a transversely extending pin 23 with the end portions of the latter extending beyond the side walls of the shank 22. The shank 22 is of a diameter sufficient to snugly fit within the extension 11 to a position where the ends of the pin 23 engage in notches 24 formed in the threaded neck portion 13. To facilitate holding the shank 22 stationary, there is provided a handle bar 25. Slidably mounted upon the shank 22 is the hub 26 of the tool 21. This hub 26 provides longitudinally extending lugs 27 which are adapted to engage in the notches 28 formed in the compression nut 20. Formed integral with the hub 26 is a handle bar 29. When the shank 22 is projected into the extension section 11, the ends of the pin 23 will engage in the notches 24. The lugs 27 of the hub 26 will engage in the notches 28 of the compression nut. Thus, by holding the shank 22 against rotation, which results in holding the extension section 11 against rotation, the compression nut 20 by rotation of the hub 26 may be threaded upon the threaded neck portion 13 to compress the collar 19 to wedge the inner end portions thereof between the sleeve 14 and the pipe 10' to form an effective seal therebetween.

The outer end portion of the threaded neck indicated at 13' is substantially flush with the outer end portion indicated at 19' of the pipe 10'. The pipe 10' is connected to a similarly lined pipe by means of a nipple 30.

From the foregoing description, it will be apparent that I have provided a liner pipe which will be effectively sealed within a pipe to be lined thereby and which, when mounted in the latter, will prevent the escape of gas or fluid from the lined pipe, which would otherwise result in the rusting or pitting of the lined pipe, especially when the latter is located underground subject to the elements which result in rusting and pitting of the pipe.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A pipe liner adapted to be telescoped into a pipe to be lined thereby, said pipe liner comprising a pipe section, an extension section in end abutment with one end portion of said pipe section, said extension section being provided at a point removed from said one end of said pipe section with a tapered shoulder, a sleeve fitting over said one end portion of said pipe section and being fused thereto and extending over a portion of said extension section, said sleeve having an end tapered correspondingly to and in bearing engagement with said shoulder, a sealing collar embracing a part of said extension section and in facial abutment with the outer face of said tapered end portion of said sleeve and adapted to be wedged between said sleeve and a pipe to be lined so as to seal the space between and connect said sleeve and said pipe and said shoulder and said tapered end portion of said sleeve so as to prevent longitudinal displacement between said sleeve and said extension section and to seal said extension section in end abutment to said pipe section within said sleeve, and means including a pressure nut threaded upon said extension section against said sealing collar for wedging a corner portion thereof into wedged position between said sleeve and a pipe lined by the liner.

2. A pipe liner as defined in claim 1 wherein said tapered end of said sleeve is tapered both on the inside and outside thereof and said sealing collar has said wedging corner thereof tapered correspondingly with respect to the tapered outside face of said end portion of said sleeve and over which tapered outside face said sealing collar is wedged into position between said pipe sleeve and a pipe lined thereby by said pressure nut.

References Cited in the file of this patent

UNITED STATES PATENTS

| 2,487,554 | Hurst | Nov. 8, 1949 |
| 2,517,626 | Berg | Aug. 8, 1950 |
| 2,543,954 | Barber | Mar. 6, 1951 |
| 2,731,041 | Mueller et al. | Jan. 17, 1956 |

FOREIGN PATENTS

| 201,409 | Germany | Sept. 15, 1908 |